(12) United States Patent
Kunori

(10) Patent No.: US 8,537,381 B2
(45) Date of Patent: Sep. 17, 2013

(54) IMAGE PROCESSING APPARATUS, METHOD OF CONTROLLING THE SAME AND STORAGE MEDIUM

(75) Inventor: Shiro Kunori, Yokohama (JP)

(73) Assignee: Canon Kabushiki Kaisha (JP)

( * ) Notice: Subject to any disclaimer, the term of this patent is extended or adjusted under 35 U.S.C. 154(b) by 597 days.

(21) Appl. No.: 12/755,627

(22) Filed: Apr. 7, 2010

(65) Prior Publication Data

US 2010/0253977 A1    Oct. 7, 2010

(30) Foreign Application Priority Data

Apr. 7, 2009   (JP) ................. 2009-093106

(51) Int. Cl.
*G06K 15/00* (2006.01)
*G06F 3/12* (2006.01)
*G06F 7/04* (2006.01)

(52) U.S. Cl.
USPC .......... 358/1.14; 358/1.13; 358/1.15; 726/26; 726/27; 726/33

(58) Field of Classification Search
None
See application file for complete search history.

(56) References Cited

U.S. PATENT DOCUMENTS

| | | | |
|---|---|---|---|
| 7,333,224 B2 * | 2/2008 | Gallacher | 358/1.15 |
| 2003/0227651 A1 * | 12/2003 | Mathieson | 358/1.16 |
| 2006/0289627 A1 * | 12/2006 | Nonaka et al. | 235/375 |
| 2008/0159769 A1 * | 7/2008 | Sato et al. | 399/80 |
| 2008/0170256 A1 * | 7/2008 | Matsuhara et al. | 358/1.15 |
| 2009/0201545 A1 * | 8/2009 | Matsunaga | 358/1.15 |

FOREIGN PATENT DOCUMENTS

| | | |
|---|---|---|
| JP | 08-305514 A | 11/1996 |
| JP | 2000-318913 A | 11/2000 |
| JP | 2002-132100 A | 5/2002 |
| JP | 2003-209642 A | 7/2003 |
| JP | 2008-049682 A | 3/2008 |
| JP | 2008-146202 A | 6/2008 |

OTHER PUBLICATIONS

JP OA issued Apr. 23, 2013 for corres. JP 2009-093106.

* cited by examiner

*Primary Examiner* — Thomas Lett

(74) *Attorney, Agent, or Firm* — Rossi, Kimms & McDowell LLP

(57) ABSTRACT

An image processing apparatus which is capable of improving security of a printout by preventing a user from forgetting to take out the printout, and improving the efficiency of the whole system and user operability. A network section receives a job and a user ID for identifying a user from an external apparatus, and receives a user ID for identifying a user who is to exit from a specific area. It is confirmed whether or not the received user IDs match each other, and if it is confirmed that the received user IDs match each other, it is further checked whether or not the job of the user has been executed. If it is checked that the job of the user has not been executed, an attribute of the job is changed.

7 Claims, 12 Drawing Sheets

FIG. 12

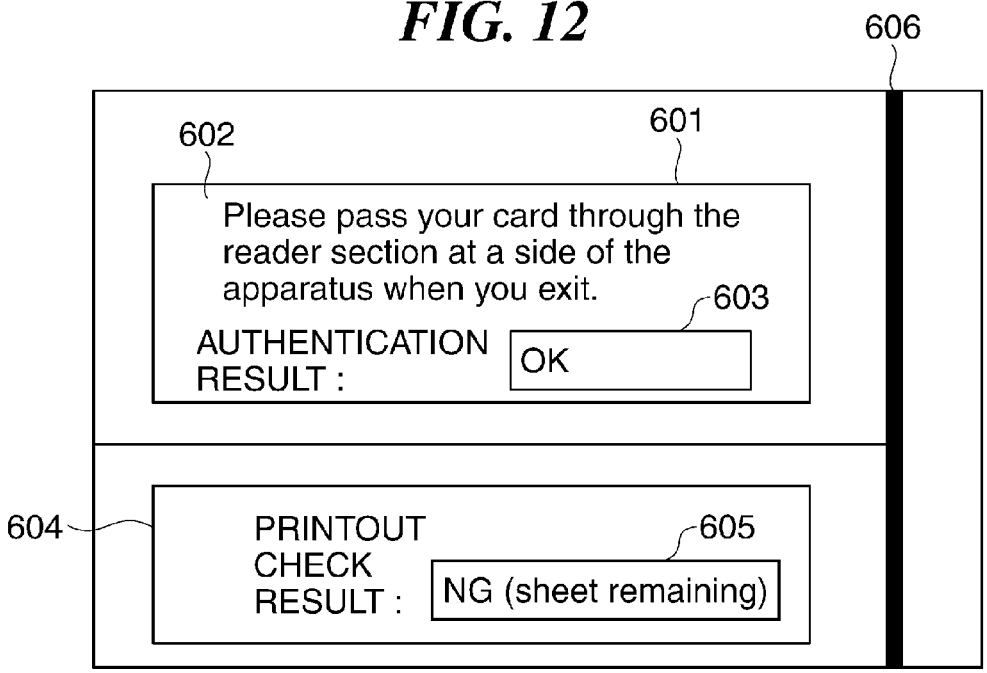

Please pass your card through the reader section at a side of the apparatus when you exit.

AUTHENTICATION RESULT : OK

PRINTOUT CHECK RESULT : NG (sheet remaining)

FIG. 13

| QUEUE No. | USER ID | JOB TYPE | JOB SETTINGS | USER EXIT STATUS |
|---|---|---|---|---|
| 1 | 10000 | PRINT | PRINTING OF PRINT DATA SET TO 10 COPIES OF 1 PAGE ON A4 SIZE SHEETS | 0 |
| 2 | 50000 | SEND | SENDING OF SCANNED DOCUMENT OF A.PDF TO ADDRESS ABC | 0 |
| 3 | 38610 | PRINT | PRINTING OF PRINT DATA SET TO ONE COPY OF 3 PAGES ON A4 SIZE SHEETS | 0 |

FIG. 14

| LIST No. | USER ID | LEFT SHEET FLAG |
|---|---|---|
| 1 | 10000 | 1 |
| 2 | 50000 | 1 |
| 3 | 38610 | 1 |

FIG. 17

| QUEUE No. | USER ID | JOB TYPE | JOB SETTINGS | USER EXIT STATUS |
|---|---|---|---|---|
| 1 | 10000 | PRINT | PRINTING OF PRINT DATA SET TO 10 COPIES OF 1 PAGE ON A4 SIZE SHEETS | 0 |
| 2 | 50000 | SEND | SENDING OF SCANNED DOCUMENT OF A.PDF TO ADDRESS ABC | 0 |
| 3 | 38610 | PRINT | PRINTING OF PRINT DATA SET TO ONE COPY OF 3 PAGES ON A4 SIZE SHEETS | 1 |

FIG. 18

| QUEUE No. | USER ID | JOB TYPE | JOB SETTINGS | USER EXIT STATUS |
|---|---|---|---|---|
| 2 | 50000 | SEND | SENDING OF SCANNED DOCUMENT OF A.PDF TO ADDRESS ABC | 0 |
| 3 | 38610 | PRINT | PRINTING OF PRINT DATA SET TO ONE COPY OF 3 PAGES ON A4 SIZE SHEETS | 1 |

IMAGE PROCESSING APPARATUS, METHOD OF CONTROLLING THE SAME AND STORAGE MEDIUM

BACKGROUND OF THE INVENTION

1. Field of the Invention

The present invention relates to an image processing apparatus (image forming apparatus) cooperating with an entrance/exit management system, a method of controlling the image processing apparatus, and more particularly to an image processing apparatus characterized by a technique for preventing printouts from being left after a print job from an external apparatus is executed and a method of controlling the image processing apparatus.

2. Description of the Related Art

A print job can be transmitted from an external apparatus, such as a PC, to an image processing apparatus, thereby causing the image processing apparatus to execute the print job and discharge a printout. However, unless a user having transmitted the print job to the image processing apparatus comes over to take the printout, the printout is left as it is, and hence there is a security problem that the printout can be viewed or taken away by another user.

Particularly when a large number of print jobs are left undone in the image processing apparatus, or when the operation of the device is stopped due to a sheet jam or during exchange of a consumable, compelling the user to wait for a long time, the user often forgets that he has sent a print job for printing.

As a conventional technique for preventing a user from forgetting to take out a printout, there has been proposed a technique in which if a remaining sheet-detecting unit detects a printout left after printing, a notification destination is notified of the fact e.g. by mail or telephone (see e.g. Japanese Patent Laid-Open Publication No. 2002-132100).

In the conventional technique for notifying that the user forgets to take out printouts, by mail or telephone, if a means, such as mail or telephone, by which the user receives the notification, is not activated, it is impossible to know that the printout is left. Further, the user cannot receive the notification until the print job is executed, so that when it takes much time before the print job is executed, the user is likely to forget that he has send the print job for printing.

As a solution to the problem, it is possible to envisage a method of automatically canceling a job requiring long waiting time and a method of transferring the job to another image processing apparatus, but these methods suffer from the problem that the user cannot always cause an image processing apparatus desired by the user to deliver a printout.

SUMMARY OF THE INVENTION

The present invention provides an image processing apparatus which is capable of improving security of a printout by preventing a user from forgetting to take out the printout, and improving the efficiency of the whole system and user operability.

In a first aspect of the present invention, there is provided an image processing apparatus comprising a first reception unit configured to receive a job and a user ID for identifying a user, transmitted from an external apparatus, a second reception unit configured to receive a user ID for identifying a user who is to exit from a specific area, a first confirmation unit configured to confirm whether or not the user ID received by the second reception unit matches the user ID received by the first reception unit, a second confirmation unit configured to be operable when it is confirmed by the first confirmation unit that the user ID received by the second reception unit matches the user ID received by the first reception unit, to confirm whether or not the job of the user received by the first reception unit has been executed, and a changing unit configured to be operable when it is confirmed by the second confirmation unit that the job of the user received by the first reception unit has not been executed, to change an attribute of the job received by the first reception unit.

In a second aspect of the present invention, there is provided a method of controlling an image processing apparatus, comprising receiving a job and a user ID for identifying a user, transmitted from an external apparatus, receiving a user ID for identifying a user who is to exit from a specific area, confirming whether or not the user ID for identifying the user who is to exit from the specific area matches the user ID sent from the external apparatus, confirming, when it is confirmed that the user ID for identifying the user who is to exit from the specific area matches the user ID sent from the external apparatus, whether or not the received job has been executed, and changing, when it is confirmed that the received job has not been executed, an attribute of the received job.

In a third aspect of the present invention, there is provided a computer-readable storage medium storing a program for causing a computer to execute a method of controlling an image processing apparatus, wherein the method comprises receiving a job and a user ID for identifying a user, transmitted from an external apparatus, receiving a user ID for identifying a user who is to exit from a specific area, confirming whether or not the user ID for identifying the user who is to exit from the specific area matches the user ID sent from the external apparatus, confirming, when it is confirmed that the user ID for identifying the user who is to exit from the specific area matches the user ID sent from the external apparatus, whether or not the received job has been executed, and changing, when it is confirmed that the received job has not been executed, an attribute of the received job.

According to the image processing apparatus of the present invention, it is possible to improve the security of a printout by preventing a user from forgetting to take out the printout and improve the efficiency of the whole system and user operability.

Further features of the present invention will become apparent from the following description of exemplary embodiments with reference to the attached drawings.

BRIEF DESCRIPTION OF THE DRAWINGS

FIG. 8 is a view illustrating an example of a user authentication screen displayed on an operating section of the PC in FIG. 2.

FIG. 9 is a view illustrating an example of a print configuration screen displayed on the operating section of the PC in FIG. 2.

FIG. 12 is a view illustrating an example of a screen displayed on the operating section of the entrance/exit management system in FIG. 3.

FIG. 13 is a view illustrating an example of an execution waiting queue stored in an HDD of the image processing apparatus in FIG. 1.

FIG. 14 is a view illustrating an example of a left sheets list stored in the HDD of the image processing apparatus in FIG. 1.

FIG. 17 is a view illustrating a first example of the execution waiting queue stored in the HDD of the image processing apparatus in FIG. 1.

FIG. 18 is a view illustrating a second example of the execution waiting queue stored in the HDD of the image processing apparatus in FIG. 1.

DETAILED DESCRIPTION OF THE EMBODIMENTS

The present invention will now be described in detail below with reference to the accompanying drawings showing an embodiment thereof.

Figure 1:
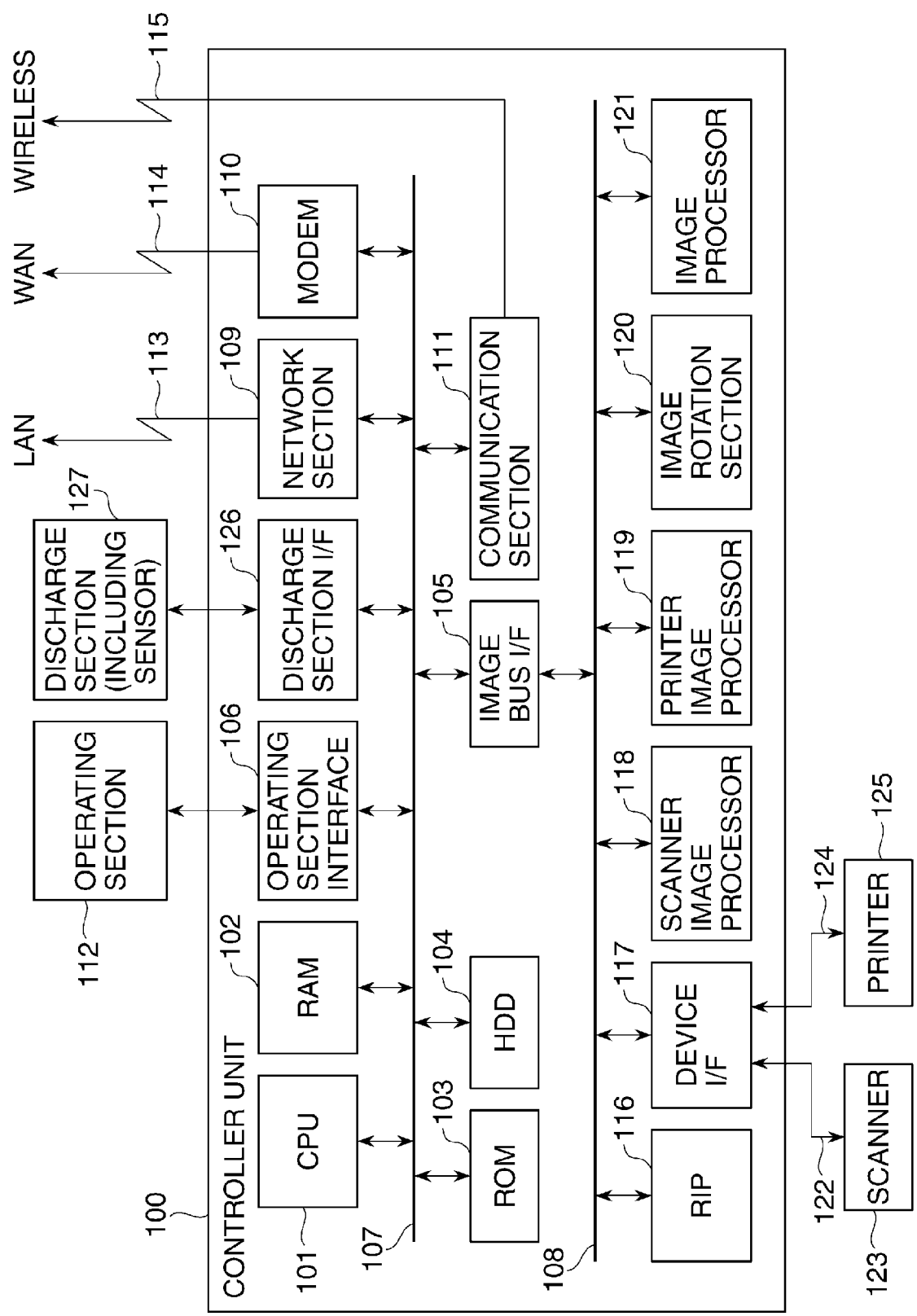
FIG. 1 is a block diagram of a controller unit and controller unit-related parts of an image processing apparatus according to an embodiment of the present invention.

FIG. 1 is a block diagram of a controller unit and controller unit-related parts of an image processing apparatus according to an embodiment of the present invention.

The controller unit 100 is connected to a scanner 123 via a scanner bus 122, and to a printer 125 via a printer bus 124.

Further, the controller unit 100 is connected to other devices or apparatuses via a LAN 113, a public communication line (WAN) 114, and a wireless 115, and controls input and output of image information and device information.

A CPU 101 is a controller for controlling the whole system of the image processing apparatus. A RAM 102 is a system work memory used for operation of the CPU 101. The RAM 102 also functions as an image memory for temporarily storing image data.

A ROM 103 is a boot ROM that stores a boot program for the system. An HDD (hard disk drive) 104 stores system software, image data, information for use in communication, and so forth.

An operating section interface 106 provides interface for an operating section 112, and outputs image data to the operating section 112 so as to cause the image data to be displayed thereon. The operating section interface 106 also plays the role of transferring information input by a user of the present system via the operating section 112 to the CPU 101.

A discharge section interface 126 provides interface for a discharge section (feeder, etc.) 127, and outputs information for performing control of sheets to be fed to the discharge section 127. A network section (comprising a first reception unit and a second reception unit) 109 is connected to the LAN 113, for input and output of information. A modem 110 is connected to the public communication line 114, for input and output of information.

A communication section 111 is connected to the wireless 115, for input and output of information. Further, the communication section 111 is capable of performing a plurality of types of wireless communications. The above-mentioned devices are connected to a system bus 107.

An image bus interface 105 is a bus bridge that connects the system bus 107 to an image bus 108 for use in high-speed transfer of image data, and performs data structure conversion. The image bus 108 is implemented e.g. by a PCI bus or an IEEE 1394.

As one of devices connected to the image bus 108, there is provided a raster image processor (RIP) 116 which rasterizes PDL code into a bitmap image. A device interface 117 connects the scanner section 123 or the printer 125 to the controller unit 100, and performs synchronous-to-asynchronous or asynchronous-to-synchronous conversion of image data.

A scanner image processor 118 performs correction, processing, and editing of input image data. A printer image processor 119 performs correction, resolution conversion, etc. on image data to be printed out, so as to make the image data conformable to the printer 125. An image rotation section 120 rotates image data. An image processor 121 performs compression/expansion of JPEG, JBIG, MMR, MH, etc. and format conversion processing for PDF, TIFF, OCR, encryption, etc. on image data.

Figure 2:
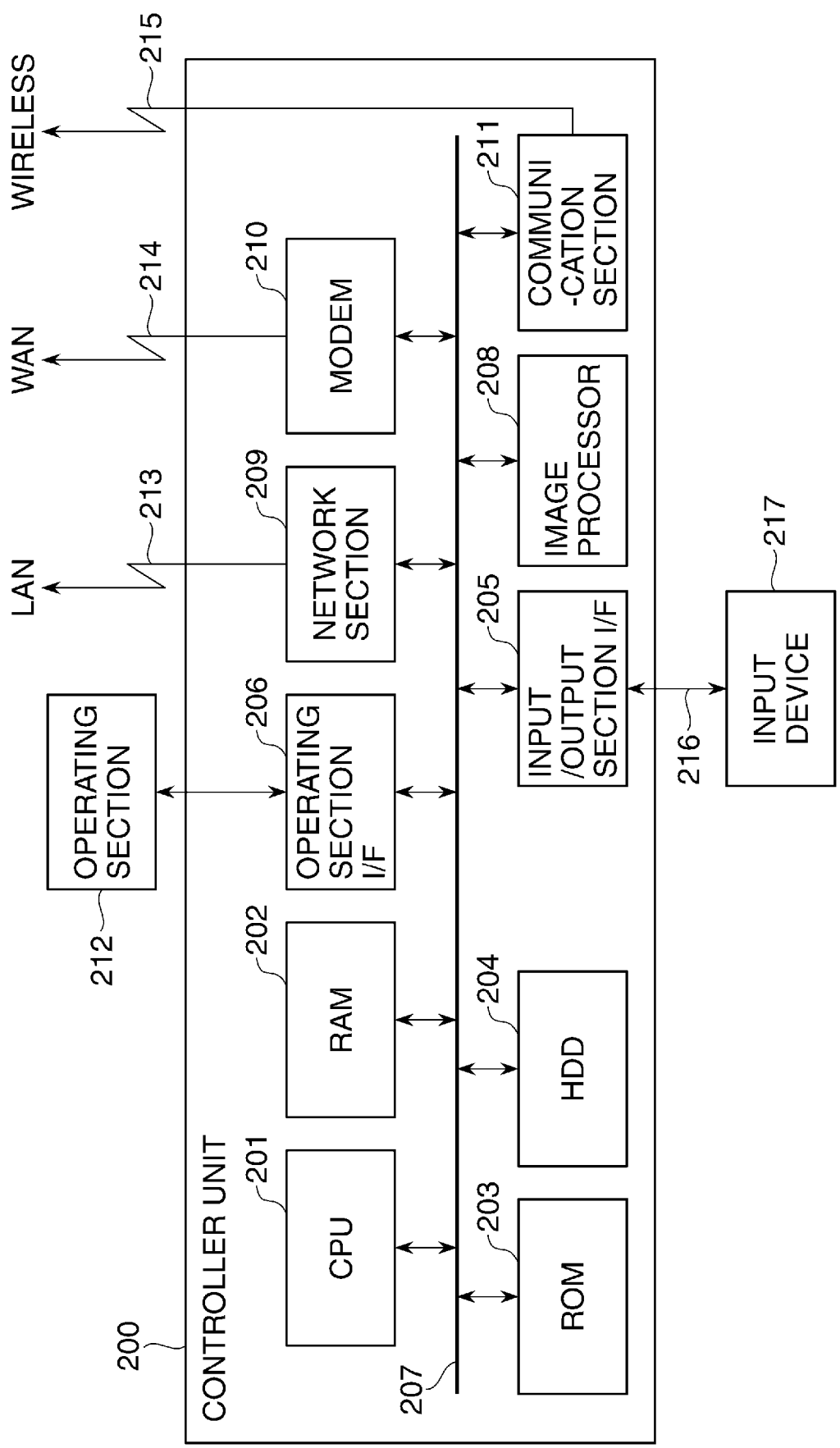
FIG. 2 is a block diagram of a controller unit and controller unit-related parts of a PC (Personal Computer) as an example of an external apparatus that issues a print job to the image processing apparatus in FIG. 1.

FIG. 2 is a block diagram of a controller unit and controller unit-related parts of a PC (Personal Computer) as an example of an external apparatus that issues a print job to the image processing apparatus in FIG. 1.

Here, the term "PC" is intended to mean a general-purpose PC, and description of component elements thereof which have nothing to do with the present embodiment is omitted.

The controller unit 200 is connected to an input device 217, such as a keyboard or a mouse, via a bus 216. Further, the controller unit 200 is connected to other devices or apparatuses via a LAN 213, a public communication line (WAN) 214, and a wireless 215, and controls input and output of print information and user information.

A CPU 201 is a controller for controlling the whole system of the image processing apparatus. A RAM 202 is a system work memory used for operation of the CPU 201. The RAM 202 also functions as an image memory for temporarily storing image data.

A ROM 203 is a boot ROM that stores a boot program for the system. An HDD (hard disk drive) 204 stores system software, image data, information required by the communication section, and so forth.

An operating section interface 206 provides interface between the controller unit 200 and an operating section 212, such as a display, and outputs image data to the operating section 212 so as to cause the image data to be displayed thereon. The operating section interface 206 also plays the role of transferring information input by the user of the present system via the operating section 212 to the CPU 201. A network section 209 is connected to the LAN 213, for input and output of information. A modem 210 is connected to the public communication line 214, for input and output of information.

A communication section 211 is connected to the wireless 215, for input and output of information. Further, the communication section 211 is capable of performing a plurality of types of wireless communications. The above-mentioned devices are connected to a system bus 207.

An input/output section interface 205 is connected to the input device 217, and receives information, such as input information and input instructions. Further, an image processor 208 performs compression/expansion of JPEG, JBIG, MMR, MH, etc. and format conversion processing for PDF, TIFF, OCR, encryption, etc. on image data so as to convert the image data into a format printable by the image processing apparatus.

Figure 3:
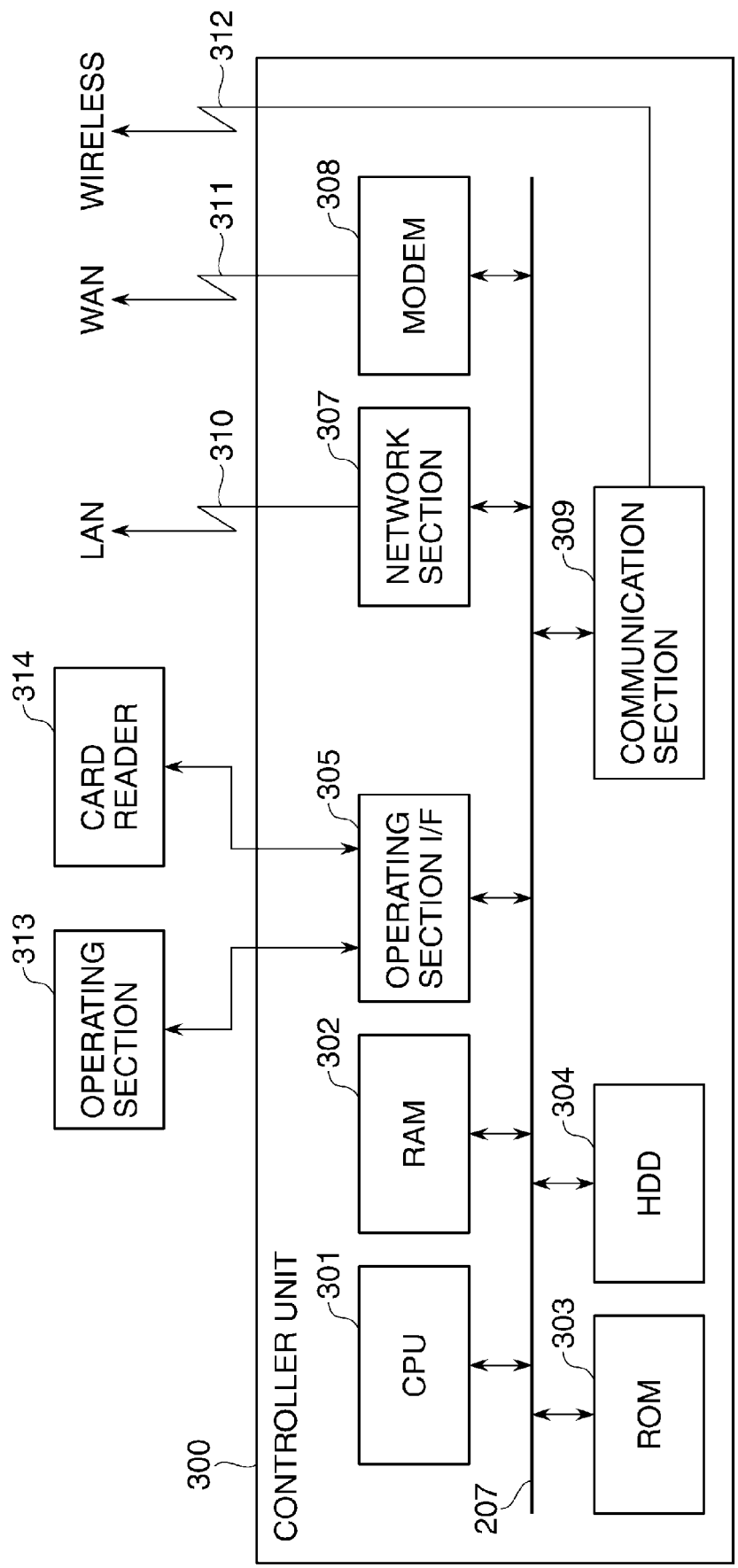
FIG. 3 is a block diagram of a controller unit and controller unit-related parts of an entrance/exit management system.

FIG. 3 is a block diagram of a controller unit and controller unit-related parts of an entrance/exit management system.

Next, the internal construction of the controller unit of the entrance/exit management system which is an example of an apparatus for detecting that a user has exited from a specific area and is disposed at a gateway of a specific area will be described with reference to FIG. 3.

The controller unit 300 is connected to other devices or apparatuses via a LAN 310, a public communication line (WAN) 311, and a wireless 312, and controls input and output of print information and user information.

A CPU 301 is a controller for controlling the whole system of the image processing apparatus. A RAM 302 is a system work memory used for operation of the CPU 301. The RAM 302 also functions as an image memory for temporarily storing image data.

A ROM 303 is a boot ROM that stores a boot program for the system. An HDD (hard disk drive) 304 stores system software, user information, information required for communication, communication addresses of image processing apparatuses existing in the specific area, and so forth.

An operating section interface 305 provides interface between an operating section 313 and a card reader 314, and outputs image data to the operating section 313 so as to cause the image data to be displayed thereon. The operating section interface 305 also plays the role of transferring information input by the user of the present system via the operating section 313 and the card reader 314 to the CPU 301.

A network section 307 is connected to the LAN 310, for input and output of information. A modem 308 is connected to the public communication line 311, for input and output of information.

A communication section 309 is connected to the wireless 312, for input and output of information. Further, the communication section 309 is capable of performing a plurality of types of wireless communications. The above-mentioned devices are connected to a system bus 306.

Figure 4:
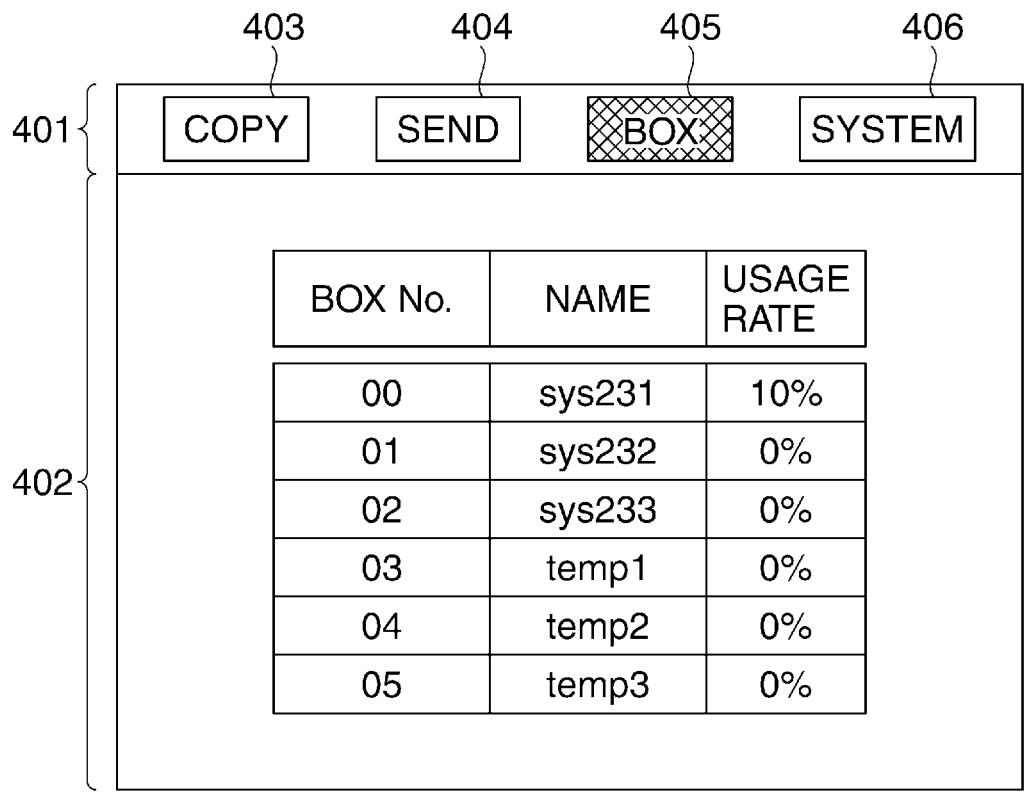
FIG. 4 is a view illustrating an example of a box screen displayed on an operating section of the image processing apparatus in FIG. 1.

FIG. 4 is a view illustrating an example of a box screen displayed on the operating section 112 of the image processing apparatus in FIG. 1.

The operating section 112 includes a touch panel-type display (not shown). Further, the operating section 112 is also provided with hard keys (not shown) including ten keys used to enter numerals, and a start key used to start processing. The user can input settings or information to the image processing apparatus by touching (pressing) icons or buttons (or soft keys) displayed on the touch panel-type display of the operating section 112 for representing respective setting items (or by pressing hard keys).

The operating section 112 comprises a common area 401 where contents common to all screens are displayed, and a function area 402 where screen-specific contents are displayed.

The common area 401 comprises a copy button 403, a send button 404, a box button 405, and a system button 406.

The copy button 403 is for displaying a copy screen for configuring copy-related settings and performing copy-related processes. Further, the send button 404 is for displaying a send screen for configuring send-related settings and performing send-related processes.

Further, the box button 405 is for displaying a box screen for configuring box-related settings and performing box-related processes (in FIG. 4, the box button 405 is displayed in reverse video for the user to be aware that it is currently selected). Further, the system button 406 is for displaying a system state screen for viewing information concerning the whole system.

The above buttons 403 to 406 are configured to be exclusive from each other such that only one selected button is activated to display contents in the function area 402.

In FIG. 4, an example of the box screen is shown.

Figure 5:
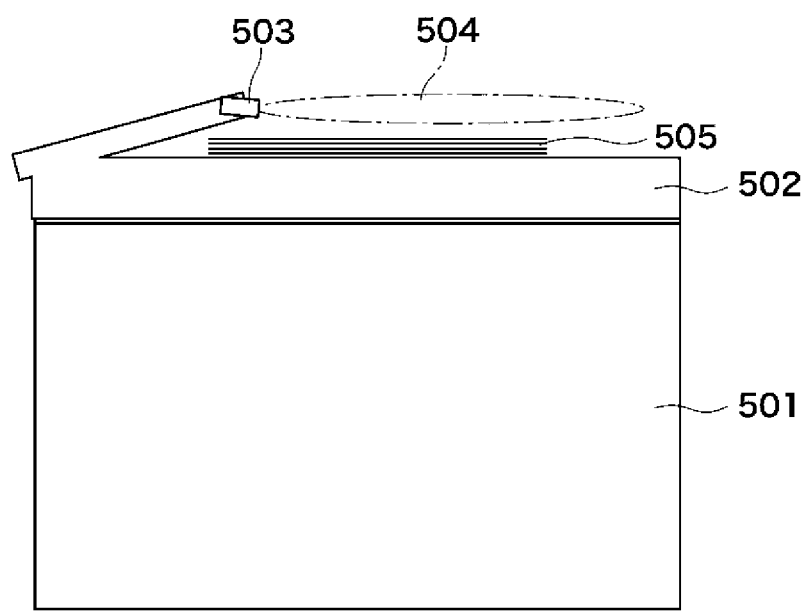
FIG. 5 is a schematic view of the whole of the image processing apparatus in FIG. 1 including a discharge section, as viewed from a lateral side thereof.

FIG. 5 is a schematic view of the whole of the image processing apparatus in FIG. 1 including the discharge section 127, as viewed from a lateral side thereof.

The image processing apparatus 501 communicates with a discharge unit 502 via the discharge section interface 126. The discharge unit 502 includes a discharge section sensor 503, and can acquire information for determining whether or not the user has removed a printout 505 from the discharge unit 502 by using the discharge section sensor 503.

More specifically, the discharge section sensor 503 detects whether or not an object has passed through a detection area 504, to thereby determine whether or not the printout 505 is removed (hereafter, it is assumed that if an object passes through the detection area 504, it is regarded that a printout 505 is removed).

Further, the discharge section sensor 503 is movable, and hence the detection area 504 recognizable by the discharge section sensor 503 may be moved to a position where a printout 505 is placed, for performing detection concerning whether or not there is a printout 505. Further, it is assumed that the discharge unit 502 and the discharge section sensor 503 are always in operation while the controller unit 100 is in operation.

The discharge section sensor 503 has the same configuration as that of a general sensor, and detailed description thereof is omitted.

Figure 6:
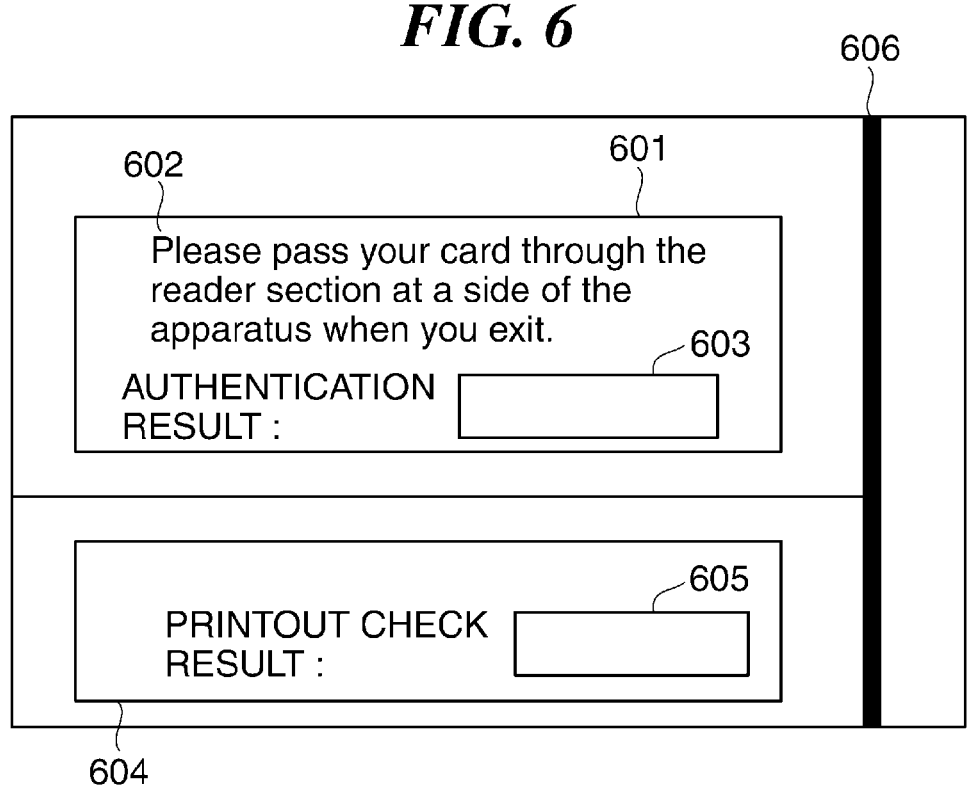
FIG. 6 is a view illustrating an example of an operating section of the entrance/exit management system in FIG. 3.

Next, an example of the operating section 313 of the entrance/exit management system in FIG. 3 will be described with reference to FIG. 6. In the illustrated example, it is assumed that the operating section 313 is integrally configured with the card reader 314.

The operating section 313 comprises an authentication message area 601, a printout message area 604, and a card reader recognition section 606. The authentication message area 601 displays a message 602 e.g. saying that "Please pass your card through the reader section at a side of the apparatus when you exit", and an authentication result area 603, and the printout message area 604 displays a printout check result area 605.

The card reader recognition section 606 has a groove through which the user passes a magnetic card, and can read information of the magnetic card passing through the groove (description thereof is omitted since the card reader recognition section 606 is of a general type).

User information can be detected from information received via the operating section interface 305. It is determined based on the detected user information whether or not the user is authorized (registered in advance) and the result of the determination is displayed in the authentication result area 603. If the result of the authentication is affirmative, the user information is further notified to the image processing apparatus, and a message based on a response from the image processing apparatus is displayed in the printout check result area 605.

Figure 7:
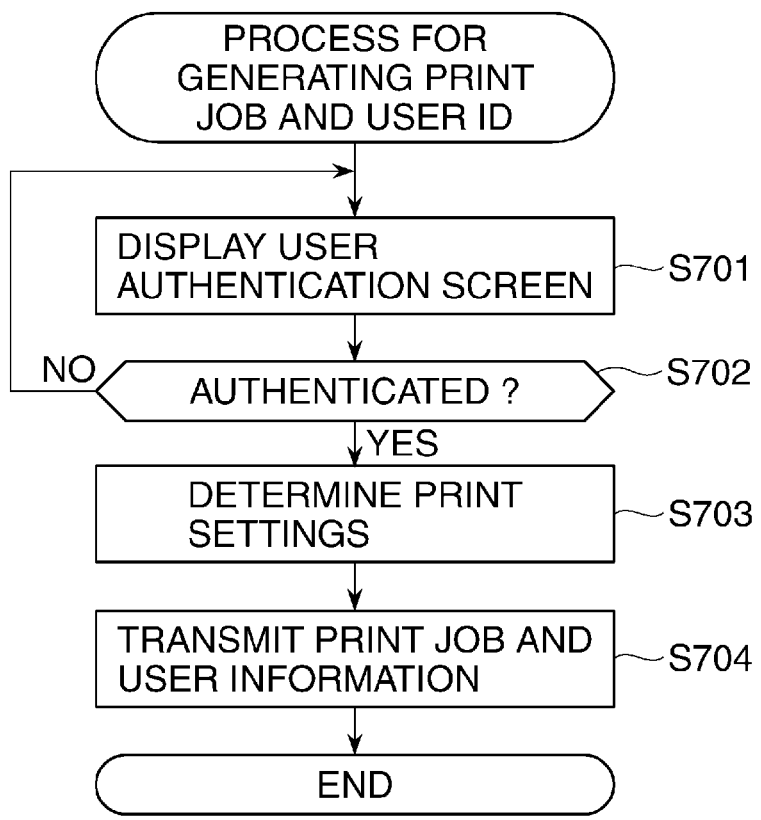
FIG. 7 is a flowchart of a process for generating a print job and a user ID that are transmitted to the image processing apparatus, which is executed by the PC in FIG. 2.

FIG. 7 is a flowchart of a process for generating a print job and a user ID that are transmitted to the image processing apparatus, which is executed by the PC in FIG. 2.

Next, the process executed by the PC for generating a print job and a user ID that are transmitted to the image processing apparatus will be described using the FIG. 7 flowchart.

In the following description, unless otherwise explicitly specified, it is assumed that the CPU of each controller unit performs processing, determination, and input and output of data to and from the operating section and the image processor thereof based on control programs and data stored in the HDD thereof Further, it is assumed that data generated during the processing, and data received from outside via the operating section interface, the network section, the modem and the communication section of each controller unit are all stored in the HDD thereof. Further, it is assumed that information displayed for the user is all displayed on the operating section via the operating section interface after being stored in the HDD of the respective controller unit.

When the user starts the PC, a user authentication screen shown in FIG. 8 is displayed on the operating section 212 (step S701). On this screen, when the CPU 201 detects that a user ID and a password have been input to a user ID area 801 and a password area 802 using the input device 217, such as the keyboard, respectively, the following processing is carried out:

First, it is authenticated whether or not the input user ID and password match information stored in advance in the HDD 204 (step S702). Hereafter, if a pair of user information (user ID) and a password input by the user match user information and a password of the user, stored in advance in the HDD 204, the user is referred to as "an authorized user", and if not, the user is referred to as "an unauthorized user".

If it is determined based on a result of the authentication that the user ID and the password are input by an unauthorized user, the user authentication screen is returned again to the state before the user ID and the password have been input via the input device 217 (the process returns to the step S701, wherein a user authentication screen illustrated in FIG. 8 is displayed again on the operating section 212).

On the other hand, if it is determined based on the result of the authentication that the user ID and the password are input by an authorized user, the user is regarded as a user in a logged-in state, and the process proceeds to the following steps (step S703 and S704)

Next, a description will be given of a process performed when the user executes an application program e.g. for editing files, on the PC. When the user gives a print instruction from the application program, a print configuration screen as shown in FIG. 9 is displayed on the operating section 212.

On the print configuration screen, print settings (in the illustrated example, for printing one copy of all pages by the image processing apparatus (printer) A) are made, and an OK button 901 is pressed, whereupon the following process is performed.

When the CPU 201 detects that printing is instructed to be started by pressing the OK button 901 (step S703), the CPU 201 identifies, based on the information set from the operating section 212, print data, the user information (user ID) of the user in the logged-in state, and an image processing apparatus to be communicated with, for printing.

Here, the term "print data" is intended to mean data converted by the image processor 208 into a data format (e.g. PDL data) printable by the image processing apparatus identified in the step S704.

Then, the CPU 201 transmits a print job (including the print data) and the user ID from the PC to the identified image processing apparatus via the LAN 213 (step S704).

The above-described process makes it possible to transmit the print job and the user ID from the PC to the image processing apparatus.

First, an example of an entrance/exit management system and image processing apparatuses arranged in an specific area will be described with reference to FIG. 10. In the illustrated example, the image processing apparatuses 1004 and 1005 are arranged in the specific area 1001.

Further, the entrance/exit management system 1003 is disposed in the vicinity of an entrance/exit door 1002 through which the user exits from the specific area 1001. For the user to exit from the specific area 1001, authentication of the user is performed by the entrance/exit management system 1003, and when the user is permitted to exit, the entrance/exit door 1002 is opened.

Figure 10:
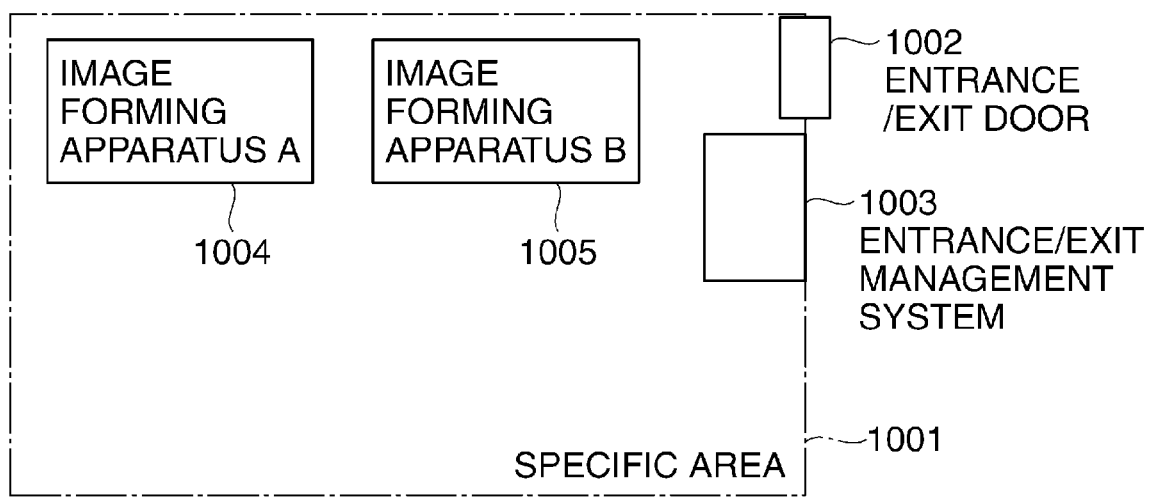
FIG. 10 is a schematic diagram of the relationship between a specific area and the entrance/exit management system in FIG. 3.
Figure 11:
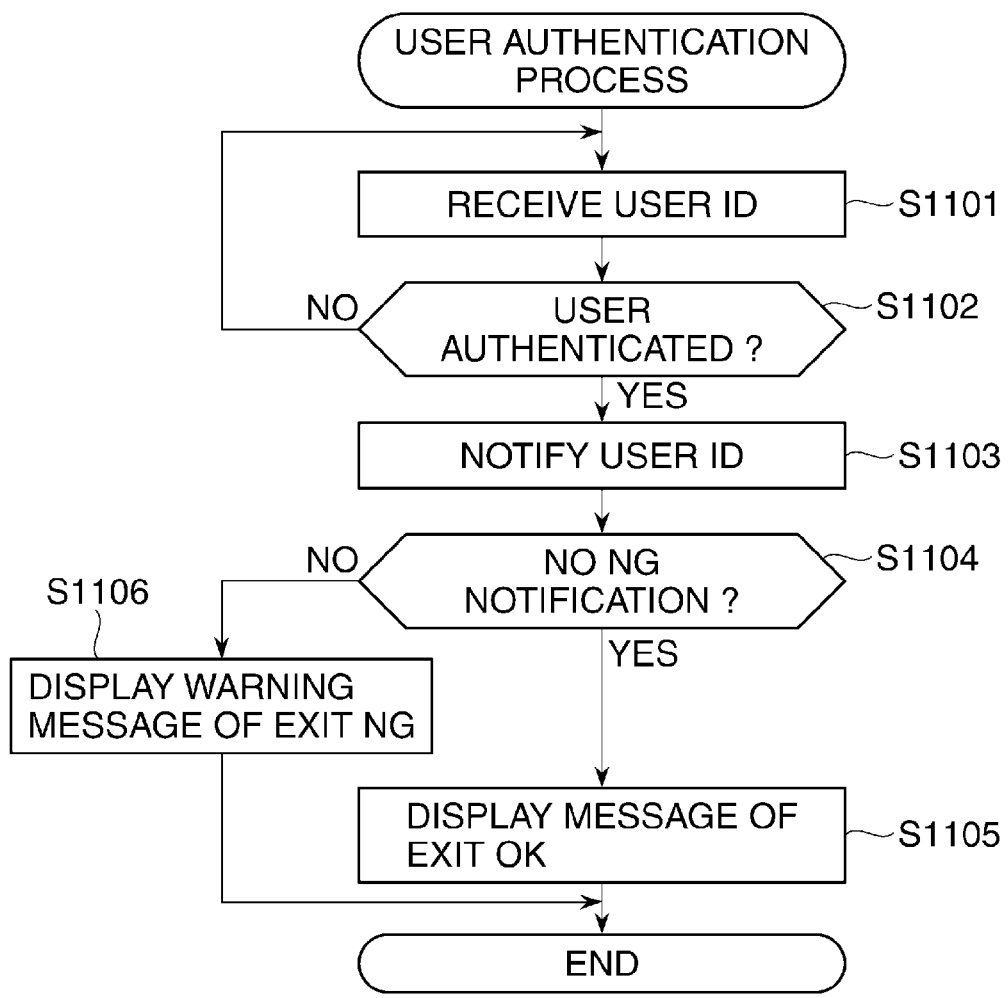
FIG. 11 is a flowchart of a user authentication process executed by the entrance/exit management system shown in FIGS. 3 and 10.

FIG. 11 is a flowchart of a user authentication process executed by the entrance/exit management system shown in FIGS. 3 and 10.

Next, the user authentication process which is executed by the entrance/exit management system when the user exits from the specific area will be described with reference to FIG. 11.

The CPU 301 detects that the user has passed a magnetic card through the card reader recognition section 606 of the entrance/exit management system 1003, and receives a user ID stored in the card via the operating section interface 305 (step S1101). Then, the CPU 301 compares whether or not the user ID matches a user ID stored in advance in the HDD 304 (step S1102).

As a result of the comparison, if the user ID does not match the user ID stored in the HDD 304, the CPU 301 regards the user as an unauthorized user to display "NG" in the authentication result area 603, and the process returns to a state before reception of the user ID (before the step S1101).

On the other hand, as the result of the comparison, if the user ID matches the user ID stored in the HDD 304, the CPU 301 regards the user as an authorized user to display "OK" in the authentication result area 603, and notifies the image processing apparatuses in the specific area of the user ID via the LAN 311 (step S1103).

In response to the user ID (this process will be described in detail hereinafter), the image processing apparatuses notify information that the exit of the user is permitted ("EXIT OK") or is inhibited ("EXIT NG") to the CPU 301, and the CPU 301 determines whether or not there is received any notification of "EXIT NG" (step S1104).

If the CPU 301 receives the information of "EXIT OK" from all the image processing apparatuses notified of the user ID, the CPU 301 displays "OK" in the printout result area 605, and completes the present process (step S1105). If it is impossible to receive a determination result responsive to the user ID from an image processing apparatus notified of the user ID even after the lapse of a predetermined time period, it is regarded that "EXIT OK" is notified from the image processing apparatus (although it may be configured to be regarded that "EXIT NG" is notified from the image processing apparatus, in the present embodiment, it is regarded that "EXIT OK" is notified from the image processing apparatus). Then, the CPU 301 opens the entrance/exit door 1002.

On the other hand, if the CPU 301 receives the information of "EXIT NG" from at least one of the image processing apparatuses to which the CPU 301 has transmitted the user ID, the CPU 301 displays a warning message (shown e.g. in FIG. 12) saying that the printout check result is "NG", in the printout result area 605, and completes the present process (step S1106).

In the present embodiment, the entrance/exit door 1002 is kept closed (although the entrance/exit door 1002 may be configured to open, in the present embodiment, the entrance/exit door 1002 is kept closed so as to force the user to go over to take the printout).

As described above, when the user exits from the specific area, the above-described process is performed whereby if the user has not taken out a printout from the discharge section 127, a warning for causing the user to take out the printout is issued, whereas if there is no printout in the discharge section 127, the user can exit from the specific area without being warned.

Next, processing by the image processing apparatus will be descried. First of all, a description will be given of an execution waiting queue and a left sheets list stored in the HDD 104 of the image processing apparatus. Then, a description will be given of a case where the image processing apparatus receives the user ID from the entrance/exit management system 1003, and finally a description will be given of processing performed by the image processing apparatus when it actually executes a job.

When the print job and the user ID transmitted from the PC are received by the network section 109 of the image processing apparatus, the print job and the user ID are stored in the execution waiting queue in the HDD 104 in a manner associated with each other. In the execution waiting queue, there are arranged jobs of any of the job types of "copy", "print", "box", etc., in the order of execution thereof. Accordingly, when a new job is added to the queue, it is added to the trailing end of the queue.

Illustrated in FIG. 13 is an example of the execution waiting queue which includes a latest added print job associated with a user ID: 38610 (a job of a job type "print" with job settings of printing one copy of three pages on A4 size sheets).

In the above execution waiting queue, a user exit status is also stored as an item associated with the user ID and the job type. In the case of a newly added job, a default value of 0 (indicating that an associated user has not exited) is automatically input to an associated box of the column of the user exit status.

Further, when the user ID is notified from the entrance/exit management system 1003, the value of the user exit status associated with the user ID is changed to 1 (indicating that the associated user has exited). For example, when the user ID 38610 is notified from the entrance/exit management system 1003, the value of the user exit status having queue No. 3 in FIG. 13 is changed to 1. It should be noted that information on the job type, job settings and user exit status of a job in the execution waiting queue in FIG. 13 corresponds to an attribute of a job in the present invention.

The HDD 104 of the image processing apparatus also stores the left sheets list to which are added information items each concerning a printout when the printout is actually delivered (an example of the left sheets list is illustrated in FIG. 14). This left sheets list includes user IDs each for identifying information of a user having performed printing, and left sheet flags each for use in determining whether or not the user has removed a printout delivered by the printing. When a left sheet flag is first added to this left sheets list together with a user ID associated therewith, a default value of 1 (indicating that the printout is left) is automatically input to an associated box of the column of the left sheet flag.

When it is notified by the discharge section interface 126 that printed products (printouts) have been removed, all the left sheet flags registered in the left sheets list are changed to 0 (indicating that no printed products are left). For example, when the left sheets list is in the state illustrated in FIG. 14, when it is notified by the discharge section interface 126 that the printed products have been removed, all the left sheet flags associated with the list Nos. 1 to 3 are changed to 0.

In the present embodiment, all the left sheet flags are changed to 0. However, if a plurality of discharge trays are provided, and sensors are arranged in the respective trays, thereby making it possible to detect from which discharge tray printed products have been removed, it is possible to change only a left sheet flag associated with a list number associated with the removed printed products to 0.

To this end, for example, it is only required that a plurality of discharge trays are provided, and sensors are arranged in the respective trays, thereby making it possible to detect from which discharge tray printed products have been taken out, i.e. removed.

Further, when it is notified by the discharge section interface 126 that no printed products remain in the discharge section 127, all the contents of the left sheets list are deleted to make the list empty.

Figure 15:
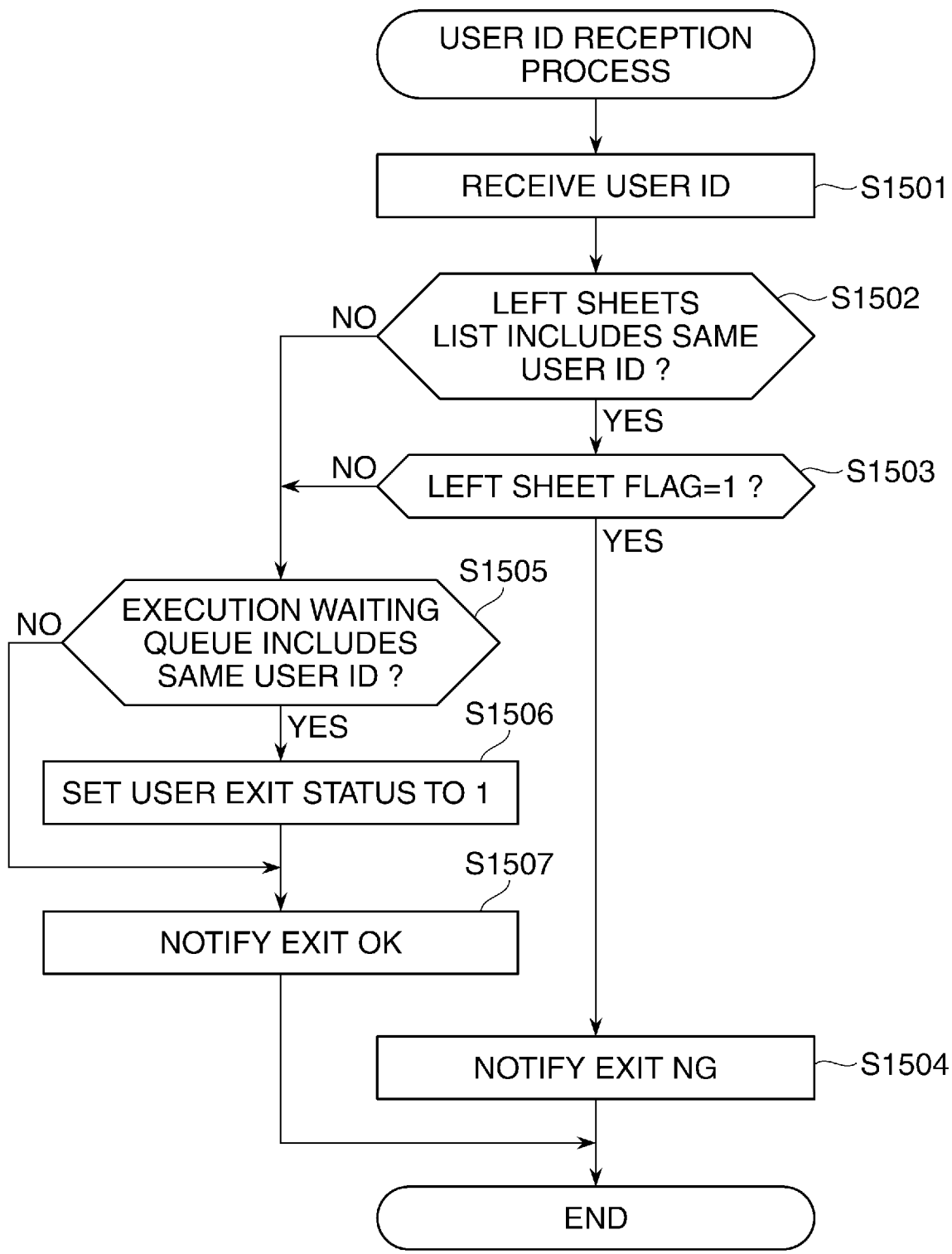
FIG. 15 is a flowchart of a user ID reception process executed by the image processing apparatus in FIG. 1 when a user ID is received from the entrance/exit management system shown in FIGS. 3 and 10.

FIG. 15 is a flowchart of a user ID reception process executed by the image processing apparatus in FIG. 1 when a user ID is received from the entrance/exit management system shown in FIGS. 3 and 10.

When the user ID of a user who is about to exit is received via the network section 109 (step S1501), it is determined whether or not the left sheets list includes the same user ID as the received user ID (step S1502).

The step S1501 corresponds to the function of the second reception unit in the present invention, for receiving a user ID used for identifying a user who is about to exit from the specific area.

If the left sheets list does not include the same user ID, the process proceeds to a step S1505, wherein the execution waiting queue is checked. On the other hand, if the left sheets list includes the same user ID, a left sheet flag stored in a manner associated with the user ID is checked from the left sheets list (step S1503).

If it is determined in the step S1503 that the left sheet flag is equal to 1 (indicating that the printed product is left), "NG (printed product remaining)" is notified to the entrance/exit management system 1003 (step S1504), followed by terminating the present process. However, if the left sheet flag is equal to 0 (indicating that no printed product remaining), it is checked in the step S1505 whether or not the same user ID as the user ID received from the entrance/exit management system 1003 is in the execution waiting queue (step S1505).

The step S1504 corresponds to the function of a warning unit in the present invention, for giving a warning to the user who is about to exit from the specific area, if it is not detected by the discharge section sensor 503 that the user has removed a printout after a job of the user received by the first reception unit in the present invention has been executed.

The step S1505 corresponds to a function of a first confirmation unit in the present invention, for confirming whether or not a user ID received by the second reception unit in the present invention matches a user ID received by the first reception unit in the present invention. Further, the step S1505 corresponds to a function of a second confirmation unit in the present invention, for confirming whether or not the job of the user ID received by the first reception unit has been executed, when it is confirmed by the first confirmation unit that the user IDs match each other.

If it is determined in the step S1505 that a job having the same user ID is not in the execution waiting queue, "OK" is notified to the entrance/exit management system 1003 (step S1507), followed by terminating the present process, whereas if a job having the same user ID is in the execution waiting queue, the value of an associated user exit status in the execution waiting queue is changed to 1 (indicating that the associated user has exited) (step S1506).

This is because execution of the job in the execution waiting queue is suspended since the user exits from the specific area. Then, after the value of the user exit status has been changed, "OK" is notified to the entrance/exit management system 1003 (step S1507), followed by terminating the present process.

The step S1506 corresponds to a function of a changing unit in the present invention, for changing an attribute of the job received by the first reception unit in the present invention, if it is confirmed by the second confirmation unit in the present invention that the job has not been executed.

The CPU 101 corresponds to a retry unit in the present invention, for returning a job of a user who has returned to the specific area, out of jobs whose attributes have been changed by the changing unit in the present invention, to a state before the attribute of the job has been changed, when the second reception unit in the present invention receives the user ID of the user, out of users having exited from the specific area, who has returned to the specific area.

Further, the CPU 101 corresponds to a predicting unit in the present invention, for predicting time taken to execute the job received by the first reception unit. Further, the function of the changing unit in the present invention includes changing the attribute of the job received by the first reception unit, based on the time predicted by the predicting unit.

Further, the function of the changing unit includes changing the attribute of the job received by the first reception unit, based on a result of the detection by the discharge section sensor 503.

Next, a job execution process for actually executing a job by the image processing apparatus having the above-mentioned execution waiting queue will be described with reference to FIG. 16.

Figure 16:
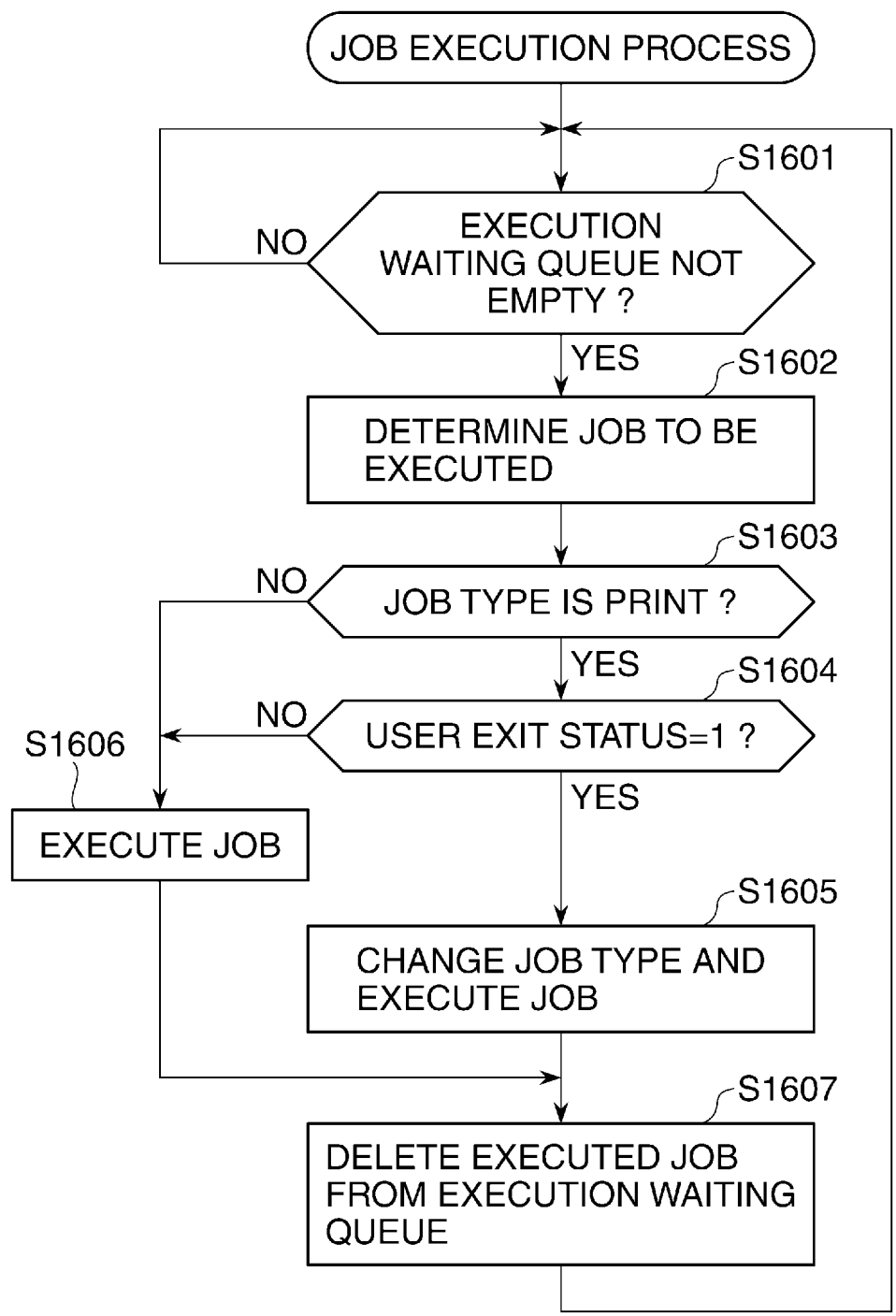
FIG. 16 is a flowchart of a job execution process executed by the image processing apparatus in FIG. 1.

FIG. 16 is a flowchart of the job execution process executed by the image processing apparatus in FIG. 1.

First of all, it is determined whether or not the execution waiting queue is empty (step S1601). If the execution waiting queue is empty, the determination in the step S1601 is repeatedly executed until a new job is input to the execution waiting queue.

If the execution waiting queue is not empty, a job in a first position in the execution waiting queue is determined (step S1602). Then, it is determined whether or not the job is of a job type involving delivering a printout (step S1603).

If the job is not of a job type involving delivering a printout (e.g. if the job type is "send" for sending scanned data via the network), the following steps are executed: First, the job is immediately executed (step S1606), and the job is deleted from the execution waiting queue (step S1607), followed by the process returning to the determination whether or not the execution waiting queue has become empty (step S1601).

On the other hand, if the job is of a job type involving delivering a printout, it is determined whether or not the value of a user exit status associated with the job is equal to 1 (step S1604). If it is determined that the value of the user exit status is not equal to 1 (if equal to 0), the user is within the specific area, so that the job is immediately executed (step S1606), and the job is deleted from the execution waiting queue (step S1607), followed by the process returning to the determination whether or not the execution waiting queue has become empty (step S1601).

However, if the value of the user exit status is equal to 1, the job is changed such that the type thereof becomes "box" (job for storing job contents in the HDD 104), and the changed job is executed (step S1605).

After that, the job is deleted from the execution waiting queue (step S1607), followed by the process returning to the determination whether or not the execution waiting queue has become empty (step S1601).

Next, a description will be given of a case where the execution waiting queue shown in FIG. 17 is stored in the HDD 104, by way of example.

First, it is checked whether or not the execution waiting queue is empty (step S1601). As a result of the check, it is determined that there are three jobs awaiting execution in the execution waiting queue and a job which has queue No. 1 and is in the first position in the queue is to be executed (step S1602).

Next, by checking the job type of this job, it is determined that the job type is "print" (step S1603), and hence further the value of the user exit status is also checked (step S1604). As the result of this check, it is determined that the value of the user exit status is equal to 0, which means that the user who has requested execution of the job has not exited from the specific area, so that the job having job settings of "printing of print data set to 10 copies of 1 page on A4 size sheets" is immediately performed (step S1606). Then, the job is deleted from the execution waiting queue (step S1607). Consequently, the execution waiting queue is placed in a state shown in FIG. 18.

Next, the process returns to the step S1601, wherein the same processing as executed on the job having queue No. 1 is carried out on a job having queue No. 2. In this case, the job type of the job is "send", and hence after the step S1603, the job having job settings of "sending of scanned document of a.pdf to address abc" is performed (step S1606). Then, the job is deleted from the execution waiting queue (step S1607).

Finally, a job having queue No. 3 is executed. In this case, the same processing as executed on the job having queue No. 1 is executed up to the step S1604. In the step S1604, however, it is determined the value of the user exit status is equal to 1, and hence the job type of the job is changed from "print" to "box".

Further, the job is changed such that the job settings thereof are changed from "printing of print data set to one copy of 3 pages on A4 size sheets" to "storage of print data set to one copy of 3 pages on A4 size sheets", and the changed job is executed (step S1605). Then, the job is deleted from the execution waiting queue (step S1607).

Since the execution waiting queue becomes empty by the above-mentioned processing, the present process is suspended until a new job is input to the execution waiting queue.

As described hereinabove, a job awaiting execution, which is issued by a user who is about to exit from the specific area is checked, and the attribute of an unexecuted print job is changed, whereby it is possible to prevent execution of printing associate with the unexecuted print job. This makes it possible to prevent printouts from being left in a discharge tray.

A job of a user who exits from the specific area, which is in the execution waiting queue, is stored in the HDD 104. If the job is stored in a state configured such that it can be restored again in the execution waiting queue, it is also possible to perform the following processing:

When the entrance/exit management system 1003 detects the user ID of the user who has returned to the specific area, the entrance/exit management system 1003 notifies the image processing apparatus of this user ID. Then, when the image processing apparatus receives the user ID via the network section 109, the CPU 101 searches for the job stored in the HDD 104 in association with the user ID, and then automatically restores the job in the execution waiting queue.

Next, a second embodiment of the present invention will be described. In the following description, component elements of the present embodiment which are the same as those of the first embodiment are denoted by the same reference numerals, and description thereof is omitted. The present embodiment is distinguished from the first embodiment in that the attribute (user exit status) of a job stored in the execution waiting queue is changed not after the user exits from the specific area but before the user exits from the specific area. It is assumed that all the processes characterizing the present embodiment are performed by the image processing apparatus.

In the first embodiment, when a new job is added to the execution waiting queue in the HDD 104 of the image processing apparatus, a user exit status which indicates whether or not a user associated with the new job has exited from the specific area, is set to a default value of 0 (indicating that the user has not exited). However, the default value of the user exit status can be changed by performing the following processing:

It is assumed that an exit time when the user is scheduled to exit from the specific area is stored in the HDD 104, and further time taken to execute all the jobs stored in the execution waiting queue can be predicted.

Next, a process for determining the value of the user exit status in the above-mentioned case will be described with reference to FIG. 19. A part of the process performed after the value of the user exit status is determined and is input to the execution waiting queue is the same as in the first embodiment, and hence description thereof is omitted.

Figure 19:
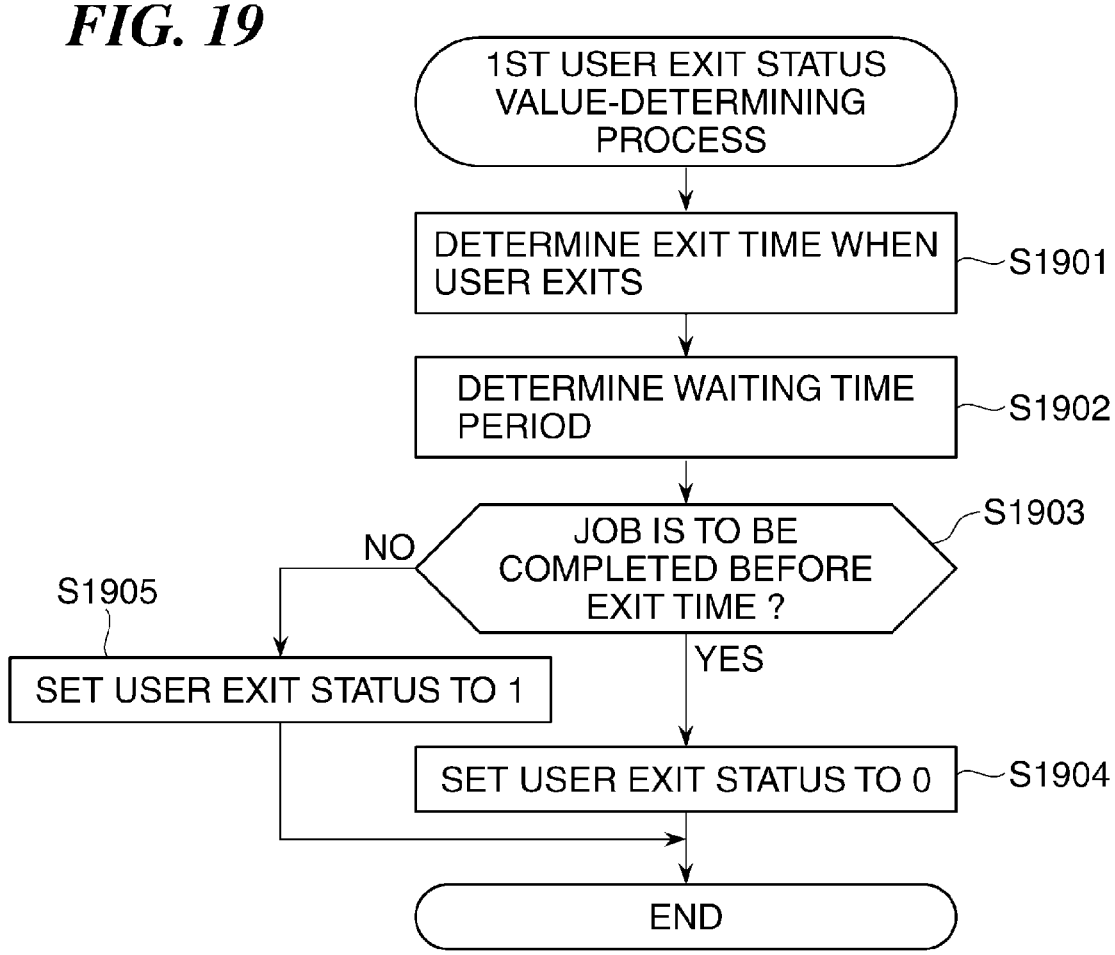
FIG. 19 is a flowchart of a first user exit status value-determining process for determining a user exit status value in the execution waiting queue, which is executed by the image processing apparatus in FIG. 1.

FIG. 19 is a flowchart of a first user exit status value-determining process executed by the image processing apparatus in FIG. 1, for determining a user exit status value to be stored in the execution waiting queue.

First, an exit time is determined which has been stored in the execution waiting queue in a manner associated with the user ID of a job to be added to the execution waiting queue (step S1901). Next, total time taken to execute all the jobs remaining in the execution waiting queue, and time taken to execute the job newly added to the queue are predicted. Then, the resulting total time is set to a waiting time period (step S1902).

Next, it is determined whether or not a time point after the lapse of the waiting time period from the current time point will be before the exit time determined in the step S1901 (step S1903).

As a result of the determination, if it is determined that the processing of the job will be terminated before the exit time when the user exits from the specific area, the value of the user exit status associated with the job to be added to the execution waiting queue is set to 0, and the job is added (step S1904). On the other hand, if it is determined that the processing of the job will be terminated after the exit time, the user exit status value of the to-be-added job is set to 1, and the job is added to the execution waiting queue (step S1905).

For example, let it be assumed that it is stored in the HDD 104 that a user having a user ID of 38610 is scheduled to exit from the specific area at 22 o'clock. Further, let it be assumed that it is possible to predict that it takes eight minutes to execute all the jobs stored in the execution waiting queue, and it takes two minutes to execute a job that the user having the user ID of 38610 has input. In this case, the first user exit status value-determining process is performed as follows:

If the job is input before 21:50, it is added to the execution waiting queue after setting a user exit status value associated therewith to 0, whereas if the job is input after 21:50, it is added to the execution waiting queue after setting the user exit status value associated therewith to 1.

Thus, when an exit time when a user is to exit from the specific area is determined, all jobs to be executed after the exit time are stored in the HDD 104, whereby it is possible to prevent printouts from being left in the discharge tray.

Next, a third embodiment of the present invention will be described. In the following description, component elements of the present embodiment which are the same as those of the first embodiment are denoted by the same reference numerals, and description thereof is omitted. The present embodiment is distinguished from the first embodiment also in that the attribute (user exit status) of a job stored in the execution waiting queue is changed not after a user associated with the job exits from the specific area but before the user exits from the specific area. It is assumed that all the processes characterizing the present embodiment are performed by the image processing apparatus.

In the first embodiment, when a new job is added to the execution waiting queue in the HDD 104 of the image processing apparatus, the value of a user exit status is set to a default value of 0. However, if the discharge section sensor 503 is capable of detecting that printed sheets the number of which is not smaller a predetermined value are placed on the discharge tray, it is possible to change the default value of the user exit status by the following process:

Now, the process for determining the value of the user exit status will be described with reference to FIG. 20. A part of the process performed after the value of the user exit status is determined and is input to the execution waiting queue is the same as in the first embodiment, and hence description thereof is omitted.

Figure 20:
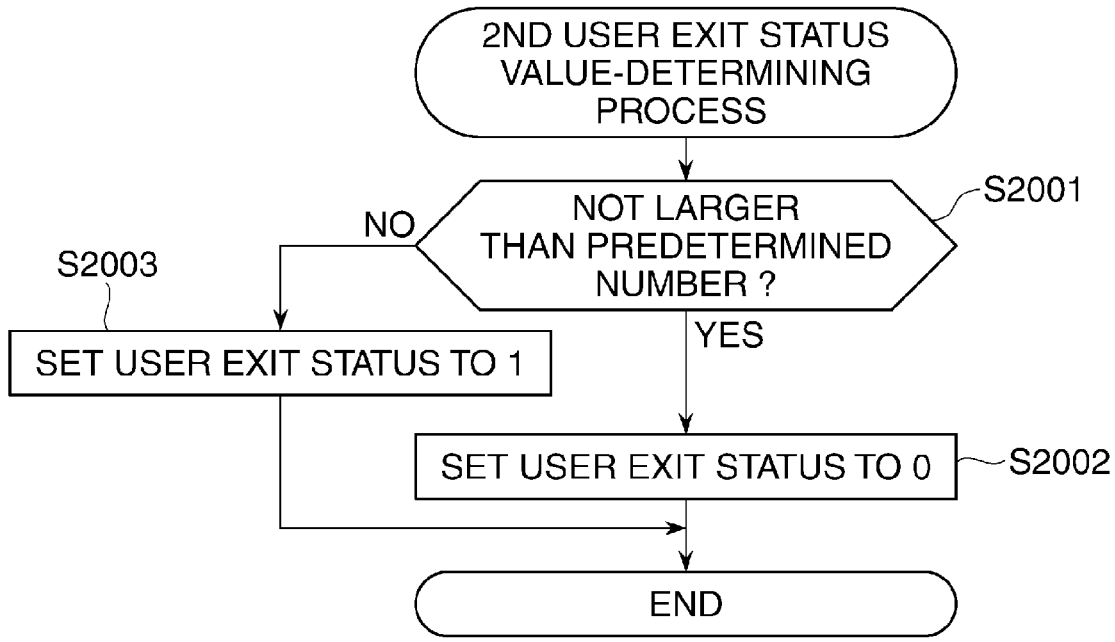
FIG. 20 is a flowchart of a second user exit status value-determining process for determining a user exit status value in the execution waiting queue, which is executed by the image processing apparatus in FIG. 1.

FIG. 20 is a flowchart of a second user exit status value-determining process executed by the image processing apparatus in FIG. 1, for determining a user exit status value to be stored in the execution waiting queue.

First, when a new job is added to the execution waiting queue, the discharge section sensor 503 checks whether or not only printed sheets the number of which is not lager than a predetermined number are placed on the discharge tray (step S2001). In this case, the check may be performed e.g. by a method of detecting a total height of the printed sheets, and regarding, if the detected total height is within a predetermined height, that the number of printed sheets on the discharge tray is not larger than the predetermined number.

As a result of the determination, if the number of the printed sheets placed on the discharge tray is not lager than the predetermined number, the job is added to the execution waiting queue after setting the user exit status value of the job to be added to the execution waiting queue to 0 (step S2002). On the other hand, if the number of the printed sheets on the discharge tray is larger than the predetermined number, the job is added to the execution waiting queue after setting the user exit status value of the job to be added to the execution waiting queue to 1 (step S2003).

Thus, if the number of the printed sheets discharged onto the discharge section 127 is larger than a predetermined number, it is possible to automatically prevent execution of printing. This makes it possible to prevent sheets from falling from the discharge section 127 and being scattered and lost therefrom.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-093106, filed Apr. 7, 2009, which is hereby incorporated by reference herein in its entirety.

What is claimed is:

1. An image processing apparatus comprising:
a first reception unit configured to receive a print job and a user ID for identifying a user, transmitted from an external apparatus;
a second reception unit configured to receive a user ID for identifying a user who is to exit from a specific area;
a first confirmation unit configured to confirm whether or not the user ID received by said first reception unit matches the user ID received by said second reception unit;
a print unit configured to be operable when it is confirmed by said first confirmation unit that the user ID received by said first reception unit does not match the user ID received by said second reception unit, to print data of the print job received by said first reception unit; and
a control unit configured to be operable when it is confirmed by said first confirmation unit that the user ID received by said first reception unit matches the user ID received by said second reception unit, to control the print unit not to print the data of the print job received by said first reception unit.

2. The image processing apparatus according to claim 1, comprising a warning unit configured to be operable when the print job of the user received by said first reception unit has been executed, to detect whether or not the printout is removed from a discharge unit, by a discharge unit sensor capable of detecting an amount of printout discharged onto said discharge unit, and if the printout has not been removed, giving a warning to the user who is about to exit from the specific area.

3. The image processing apparatus according to claim 1, comprising a retry unit configured to be operable when said second reception unit receives a user ID of a user, who has returned to the specific area, out of users having exited from the specific area, to return a print job of the user having returned to the specific area, out of jobs of which respective attributes have been changed by said changing unit, to a state before the attribute of the job has been changed.

4. The image processing apparatus according to claim 1, comprising a predicting unit configured to predict time taken to execute the print job received by said first reception unit, and
wherein said control unit controls the print unit not to print the data of the print job received by said the first reception unit, based on a result of prediction by said predicting unit.

5. The image processing apparatus according to claim 2, wherein said control unit controls the print unit not to print the data of the print job received by said the first reception unit, based on a result of detection by said discharge unit sensor.

6. A method of controlling an image processing apparatus, comprising:
receiving a job and a user ID for identifying a user, transmitted from an external apparatus;
receiving a user ID for identifying a user who is to exit from a specific area;
confirming whether or not the user ID sent from the external apparatus matches the user ID for identifying the user who is to exit from the specific area;
printing, when it is confirmed that the user ID sent from the external apparatus does not match the user ID for identifying the user who is to exit from the specific area, data of the received print job; and
controlling, when it is confirmed that the user ID sent from the external apparatus matches, not to print the data of the received print job.

7. A non-transitory computer-readable storage medium storing a program for causing a computer to execute a method of controlling an image processing apparatus,
wherein the method comprises:
receiving a job and a user ID for identifying a user, transmitted from an external apparatus;
receiving a user ID for identifying a user who is to exit from a specific area;
confirming whether or not the user ID sent from the external apparatus matches the user ID for identifying the user who is to exit from the specific area;
printing, when it is confirmed that the user ID sent from the external apparatus does not match the user ID for identifying the user who is to exit from the specific area, data of the received print job; and
controlling, when it is confirmed that the user ID sent from the external apparatus matches, not to print the data of the received print job.

* * * * *